United States Patent
Simms et al.

(10) Patent No.: US 9,951,958 B2
(45) Date of Patent: Apr. 24, 2018

(54) DIFFUSION CAP BURNER FOR GAS COOKING APPLIANCE

(71) Applicant: Whirlpool Corporation, Benton Harbor, MI (US)

(72) Inventors: Russell L. Simms, Cleveland, TN (US); Siu Hun P. Yam, Benton Harbor, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 752 days.

(21) Appl. No.: 14/324,500

(22) Filed: Jul. 7, 2014

(65) Prior Publication Data

US 2014/0318526 A1 Oct. 30, 2014

Related U.S. Application Data

(63) Continuation of application No. 12/951,292, filed on Nov. 22, 2010, now Pat. No. 8,800,543.

(30) Foreign Application Priority Data

Nov. 23, 2009 (CN) ............... 2009 2 0315450 U (51) Int. Cl.
*F24C 3/08* (2006.01)
*F23D 14/06* (2006.01)
*F24C 15/10* (2006.01)

(52) U.S. Cl.
CPC ............... *F24C 3/08* (2013.01); *F23D 14/06* (2013.01); *F24C 3/085* (2013.01); *F24C 15/107* (2013.01); *Y02B 40/166* (2013.01)

(58) Field of Classification Search
CPC .................................. F23D 14/06; F24C 3/085
USPC .......................................................... 126/39 E
See application file for complete search history.

(56) References Cited

U.S. PATENT DOCUMENTS 6,537,065 B1 * 3/2003 Shirali .................... F23D 14/06
126/39 E
7,291,009 B2 * 11/2007 Kamal .................... F23D 14/06
126/39 E

FOREIGN PATENT DOCUMENTS

JP 11337016 A * 12/1999

OTHER PUBLICATIONS

JP 11337016 A—English machine translation.*

* cited by examiner

*Primary Examiner* — Jorge Pereiro (57) ABSTRACT

A gas burner for a cooking appliance includes a frustoconically-shaped crown having a plurality of gas ports defined therein, a cover positioned above the crown, and a shell secured to the cover and positioned on the crown. The shell defines a hollow chamber positioned between the crown and the cover.

15 Claims, 6 Drawing Sheets

Fig. 9

US 9,951,958 B2

DIFFUSION CAP BURNER FOR GAS COOKING APPLIANCE

CROSS-REFERENCE TO RELATED APPLICATIONS

The present application represents a continuation application of U.S. patent application Ser. No. 12/951,292 entitled "DIFFUSION CAP BURNER FOR GAS COOKING APPLIANCE" filed Nov. 22, 2010, pending.

This application claims priority under 35 U.S.C. § 119(a) to Chinese Patent Application No. 200920315450.4, which was filed on Nov. 23, 2009, the entirety of which is hereby incorporated by reference.

TECHNICAL FIELD

The present disclosure relates generally to a gas cooking appliance having gas burners and more particularly to gas cooking appliances with gas diffusion caps.

BACKGROUND

A gas cooking appliance is used to cook meals and other foodstuffs on a cooking surface or within an oven. Gas cooking appliances include ranges, cooktops, stoves, and other cooking appliances. Gas cooking appliances use natural gas or liquid petroleum (i.e., propane) fuel to create a controlled flame that generates the heat necessary for cooking.

SUMMARY

According to one aspect, a cooking appliance is disclosed. The cooking appliance includes a cooktop having a cooking surface and a gas burner positioned below the cooking surface. The gas burner includes a frustoconically-shaped crown having a plurality of gas ports defined therein, a cover positioned above the crown, and a shell secured to the cover and positioned on the crown. The shell defines a hollow chamber positioned between the crown and the cover.

In some embodiments, the diameter of an upper rim of the crown may be less than the diameter of the cover. In some embodiments, the ratio of the diameter of the cover relative to the diameter of the upper rim of the crown may be between about 1.2:1 and 1.6:1.

Additionally, in some embodiments, the shell may include a lower flange coupled to the upper rim of the crown, an upper rim having the cover secured thereto, and a waist positioned between the upper rim and the lower flange. The diameter of the waist may be less than the diameter of the upper rim of the crown.

In some embodiments, the frustoconically-shaped crown may include an inclined annular surface and may be attached to a circular base having a vertical annular surface. A first imaginary line may extend along the inclined annular surface and a second imaginary line may extend along the vertical annular surface. An angle may be defined between the first imaginary line and the second imaginary line. In some embodiments, the magnitude of the angle may be between 30 degrees and 45 degrees.

In some embodiments, the shell may include a first inclined surface. A third imaginary line may extend along the first inclined surface, and the third imaginary line may be coincident with the first imaginary line. In some embodiments, the shell may further include a second inclined surface, and a fourth imaginary line may extend along the second inclined surface orthogonal to the third imaginary line.

In some embodiments, the cover may be positioned between 21 mm and 25 mm above the crown.

According to another aspect, a gas burner for a cooktop includes a frustoconically-shaped crown having a plurality of gas ports defined therein, a cover positioned above the crown, and a shell secured to the cover and positioned on the crown. The shell defines a hollow chamber positioned between the crown and the cover.

In some embodiments, the frustoconically-shaped crown may include an inclined annular surface and may be attached to a circular base having a vertical annular surface. A first imaginary line may extend along the inclined annular surface and a second imaginary line may extend along the vertical annular surface. An angle may be defined between the first imaginary line and the second imaginary line.

In some embodiments, the shell may include a waist where the first inclined surface intersects with the second inclined surface. The crown may include an upper rim, and the diameter of the waist may be less than the diameter of the upper rim of the crown. In some embodiments, the diameter of the upper rim of the crown is less than the diameter of the cover.

According to another aspect, the gas burner includes a cap having a hollow chamber defined therein, and a body having a plurality of gas ports defined therein. The body has an inclined annular surface and a vertical annular surface. A first imaginary line extends along the inclined annular surface and a second imaginary line extends along the vertical annular surface, an angle is defined between the inclined annular surface and the vertical annular surface, and the magnitude of the angle is between 30 degrees and 45 degrees.

In some embodiments, the ratio of the diameter of an upper surface of the cap relative to the diameter of an upper rim of the body may be greater than or equal to about 1.2:1. In some embodiments, the ratio of the diameter of the upper surface of the cap relative to the diameter of the upper rim of the body may be less than or equal to about 1.6:1.

BRIEF DESCRIPTION OF THE DRAWINGS

The detailed description particularly refers to the following figures, in which.

DETAILED DESCRIPTION OF DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Figure 1:
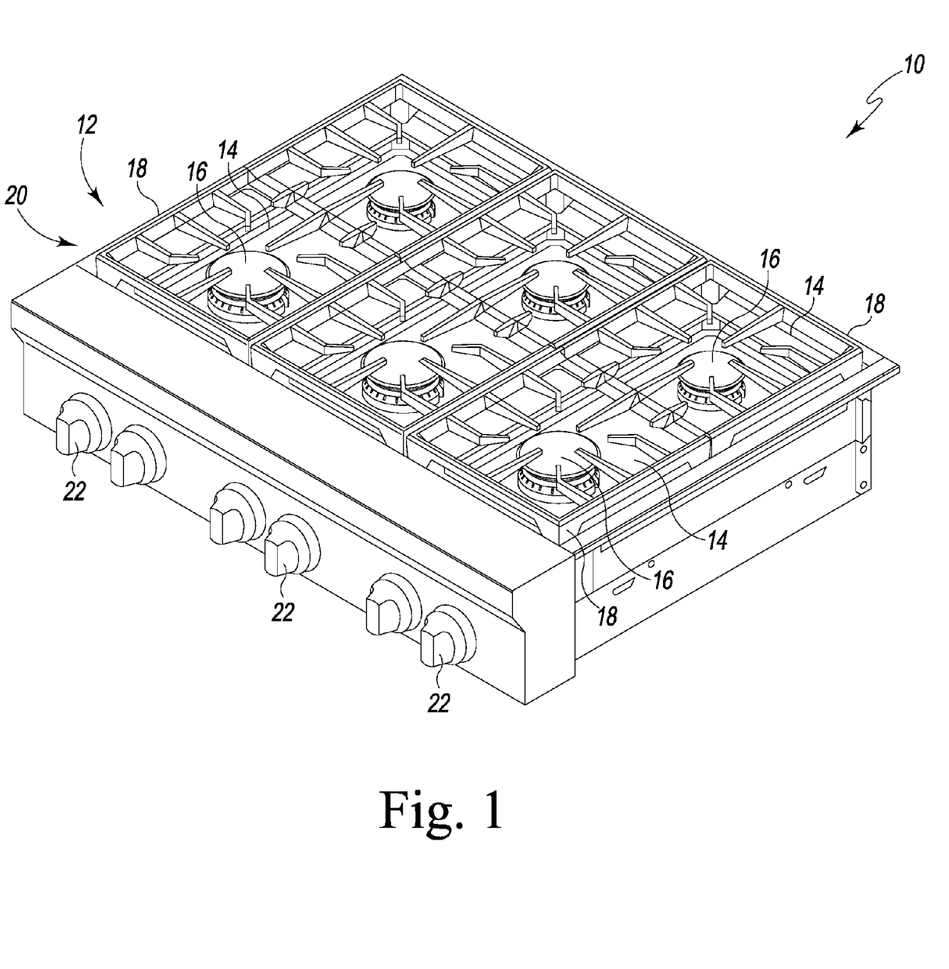
FIG. 1 is a perspective view of a gas cooking appliance.

Referring to FIG. 1, a gas cooking appliance 10 (hereinafter appliance 10) is shown. The appliance 10 includes a cooktop 12 having a plurality of separately controlled cooking areas 14. Each separately controlled cooking area 14 has a burner 16 dedicated to supplying heat to that area of the cooktop 12. Each of the burners 16 has a grate 18 positioned above it, and the grates 18 define a cooking surface 20. Each of the burners 16 is configured to produce a controlled flame that generates a quantity of heat, which may be used to heat cooking utensils (i.e., pots and pans) placed on the grates 18. The burners 16 and the grates 18 are arranged on the cooktop 12 such that a user can simultaneously heat pots, pans, skillets, and the like. As shown in FIG. 1, the cooktop 12 is configured to be positioned in a kitchen counter or cabinet. It will be appreciated that in other embodiments the cooktop 12 may be integrated with a freestanding range or other appliance.

The magnitude of the heat generated by each of the burners 16 is proportionate to the amount of gas supplied to the burner 16. A user may adjust the supply of gas to the burners 16 using a set of knobs 22 that are positioned at the front of the cooktop 12. As the user rotates one of the knobs 22, the amount of gas flowing to the corresponding burner 16 is adjusted to change the magnitude of the heat generated by the burner 16.

Referring now to FIGS. 2-5, one embodiment of a gas burner 16 is shown in greater detail. The gas burner 16 includes a flame spreader 30 and a cap 32 configured to be coupled to the flame spreader 30. The flame spreader 30 includes a circular housing 34 and a gas inlet port 36 extending downwardly from a bottom surface 38 of the housing 34 to a distal end 40. The inlet port 36 has a cylindrical body 42 with a lower opening 44 defined in the distal end 40. The lower opening 44 is configured to be connected to a gas source (not shown). The body 42 of the inlet port 36 includes a passageway 48 extending from the lower opening 44 to an upper opening 50 defined in the housing 34.

The housing 34 includes a frustoconically-shaped crown 52 extending upwardly from a circular bottom wall 54 to define a chamber 56. The chamber 56 has a circular opening 58 defined by an upper rim 60 of the crown 52, and the upper rim 60 has a diameter 62. The crown 52 has inclined annular surface 64 and inner surface 66 extending downwardly from the rim 60. A vertical annular surface 68 of the bottom wall 54 extends upwardly from the bottom surface 38 of the housing 34 and is connected to the inclined annular surface 64. It will be appreciated that in other embodiments the annular surface 68 may extend at angle rather than vertically as shown in the illustrative embodiment.

Figures 2, 3:
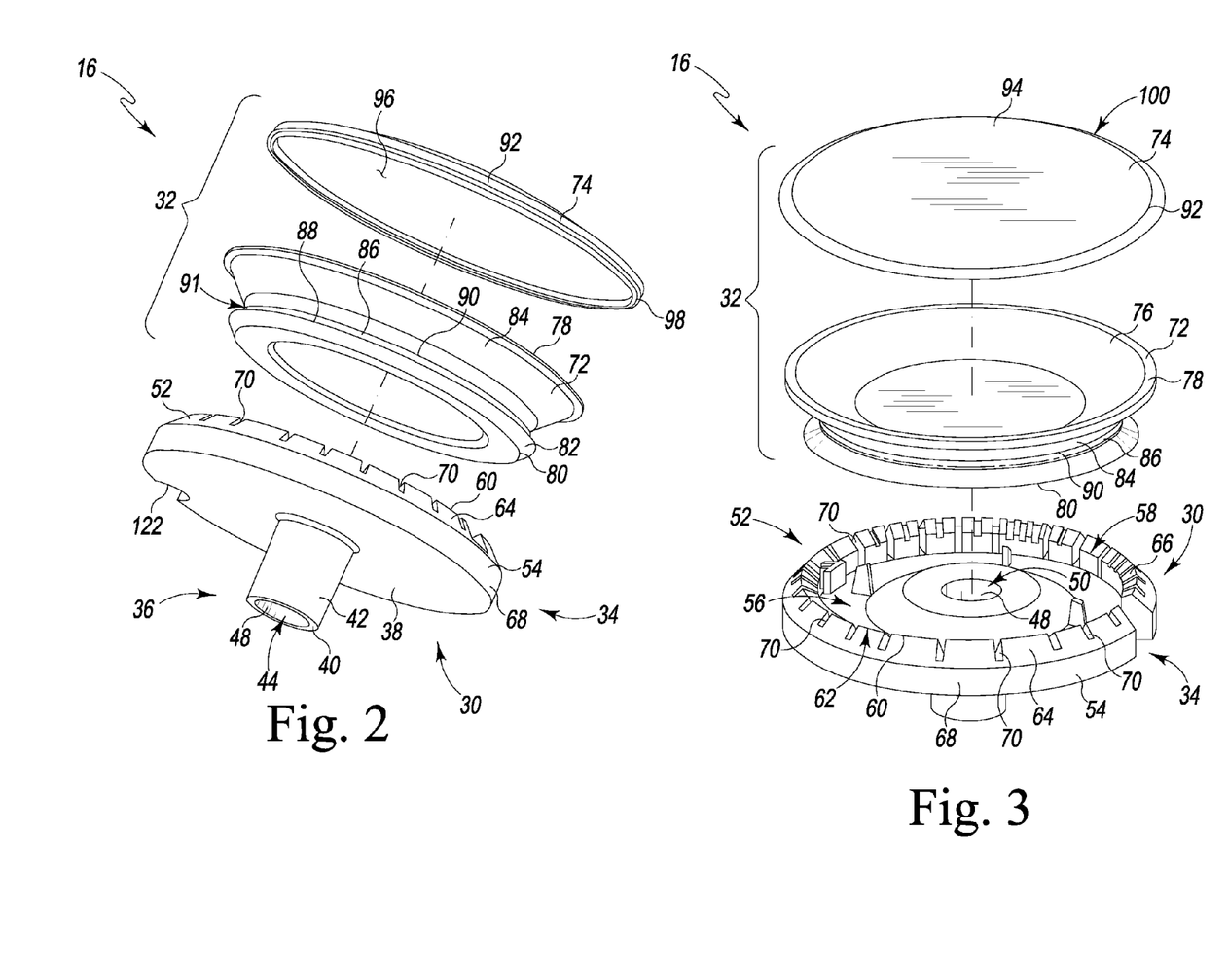
FIG. 2 is an exploded perspective view of one embodiment of a diffusion cap burner of the gas cooking appliance of FIG. 1.
FIG. 3 is another exploded perspective view of the diffusion cap burner of FIG. 2.

A plurality of gas outlet ports or slots 70 are defined in the crown 52. Each gas outlet port 70 extends downwardly from the rim 60 and radially inward from the inclined annular surface 64 to the inner surface 66. It will be appreciated that the gas outlet slots 70 may be sized differently in other embodiments. Additionally, in other embodiments, additional or fewer gas outlet ports 70 may be formed in the crown 52. As shown in FIG. 3, the upper opening 50 of the gas inlet port 36 is also positioned in the chamber 56. In that way, the gas inlet port 36 is in fluid communication with the gas outlet ports 70.

The cap 32 of the burner 16 includes a shell 72 and a circular cover 74 configured to be secured to the shell 72. The shell 72 and the cover 74 may be formed from any heat resistant material, including metallic materials such as, for example, stamped steel or brass and non-metallic materials such as, for example, porcelain. It will also be appreciated that the shell 72 and the cover 74 may be formed from the same material or from different materials.

The shell 72 has a bowl-shaped chamber 76 defined therein extending downwardly from an upper rim 78. The shell 72 includes a bottom annular flange 80 configured to engage with the crown 52. The flange 80 has a lower inclined surface 82 that matches the inner surface 66 of the crown 52. When the cap 32 is seated on the housing 34, the surface 82 of the shell 72 is positioned on the surface 66 of the crown 52, thereby enclosing the opening 58 of the chamber 56 of the crown 52.

Figure 5:
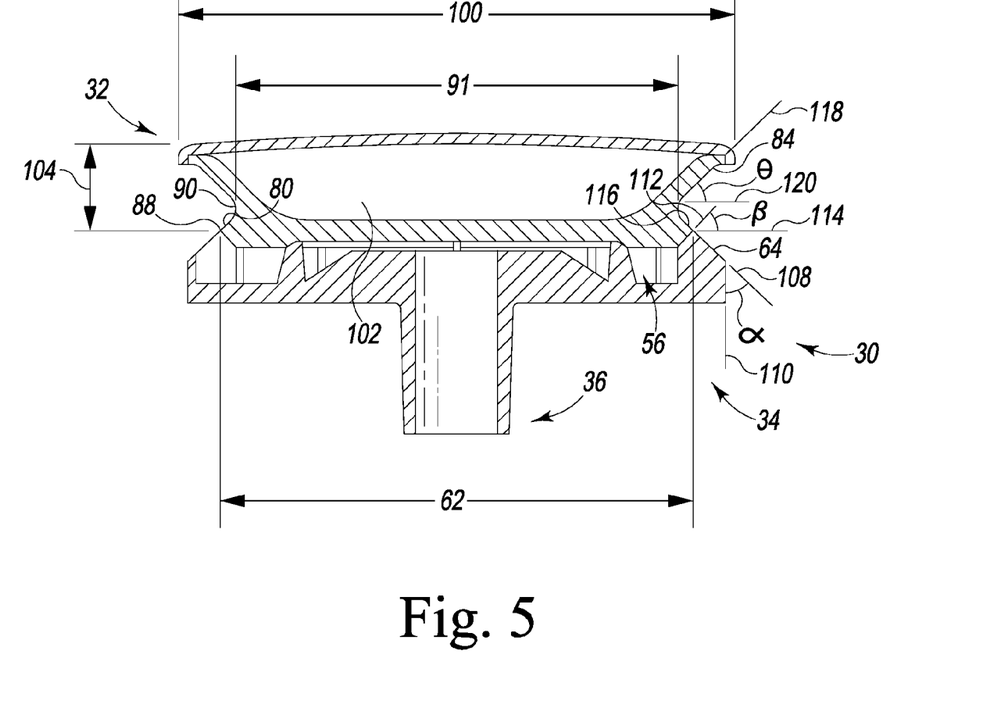
FIG. 5 is a side elevational view of the diffusion cap burner of FIGS. 2-4.

The shell 72 includes an inclined annular surface 84 extending downwardly from the rim 78. Another inclined annular surface 86 extends upwardly from a peripheral edge 88 of the flange 80 and intersects with the surface 84 at a waist or middle section 90 of the shell 72. As shown in FIG. 5, the waist 90 has a diameter 91 less than the diameter 62 of the upper rim 60 of the housing 34.

The cover 74 has a body 92 including an upper surface 94 of the cap 32. The body 92 is bowed or arched such that the upper surface 94 is convex. A hollow chamber 96 is defined by the body 92 and extends upwardly from a lower rim 98 of the cover 74. It will be appreciated in other embodiments the body 92 of the cover 74 may be flat or planar such that the chamber 96 is omitted from the cover 74. The body 92 has a diameter 100 greater than the diameter 62 of the upper rim 60 of the housing 34. The ratio of the diameter 100 to the diameter 62 is in the range of 1.4:1 to 1.6:1. In other embodiments, the ratio of the diameters 62, 100 may vary according to the burner type or cooking appliance.

When the cover 74 is secured to the shell 72, the lower rim 98 of the cover 74 extends over the upper rim 78 of the shell 72, thereby enclosing the chambers 76, 96 and forming a single hollow cavity 102 within the cap 32. The cover 74 may be secured to the shell 72 via welding, crimping, or brazing. In some embodiments, one or more fasteners, such as, for example, screws, rivets, pins, or pegs may be used to secure the cover 74 to the shell 72.

The assembled gas burner 16 is shown in FIG. 5. When the cap 32 is seated on the housing 34, the cover 74 is positioned a distance 104 from the upper rim 60 of the crown 52. The distance 104 is between 21 mm and 25 mm. In other embodiments, the distance 104 may vary according to the burner type or cooking appliance.

The burner 16 includes a number of surfaces that are angled relative to each other. This is demonstrated geometrically in the side elevational view of FIG. 5 where a number of imaginary lines extend along and through the outer surfaces of the burner 16. Specifically, an imaginary line 108 extends along the inclined annular surface 64 of the crown 52. Another imaginary line 110 extends along the vertical annular surface 68 of the bottom wall 54. An angle $\alpha$ is defined between the imaginary line 108 and the imaginary line 110. The magnitude of the angle α is between 30 degrees and 45 degrees. In other embodiments, the angle α may vary according to the burner type or cooking appliance.

As shown in FIG. 5, another imaginary line 112 extends orthogonal to the inclined annular surface 64 of the crown 52. An angle β is defined between the imaginary line 112 and a horizontal axis 114 extending through the housing 34. In the illustrative embodiment, the magnitude of the angle β is equal to the magnitude of the angle α. Another imaginary line 116 extends along the inclined annular surface 86 of the shell 72. When the cap 32 is seated on the housing 34 as shown in FIG. 5, the imaginary line 116 is coincident with the imaginary line 108 extending along the inclined annular surface 64 of the crown 52.

In the illustrative embodiment, an imaginary line 118 extends along the inclined annular surface 84 of the shell 72 orthogonal to the imaginary lines 108, 116. It will be appreciated that in other embodiments the slope of the inclined annular surface 84 may vary such that the imaginary line 118 is not orthogonal to the imaginary lines 108, 116. Additionally, an angle θ is defined between the imaginary line 118 and a horizontal axis 120 extending through the shell 72. In the illustrative embodiment, the magnitude of the angle θ is equal to the magnitude of the angle α. It will also be appreciated that in other embodiments the magnitude of the angle θ may be different from the magnitude of the angle α and may be between 30 degrees and 45 degrees. Additionally, the angle θ may vary according to the burner type or cooking appliance.

During burner operation, gas is supplied to the lower opening 44 of the inlet port 36. Gas then advances up the passageway 48 and outward through the upper opening 50 into the chamber 56. Gas is advanced out of the chamber 56 through each of the outlet ports 70 defined in the crown 52 and is ignited by an ignition device (not shown) positioned in a niche 122 formed in the housing 34 to form a flame. When operated at a low simmer, the flame is positioned below the cap 32, thereby diffusing heat away from the cooking utensil positioned on the cooking area 14. Because the shell 72 is positioned between the cover 74 and the flame spreader 30, the cavity 102 acts as an insulator to reduce heat transfer from the flame generated at the flame spreader 30 to the cover 74.

Figure 6:
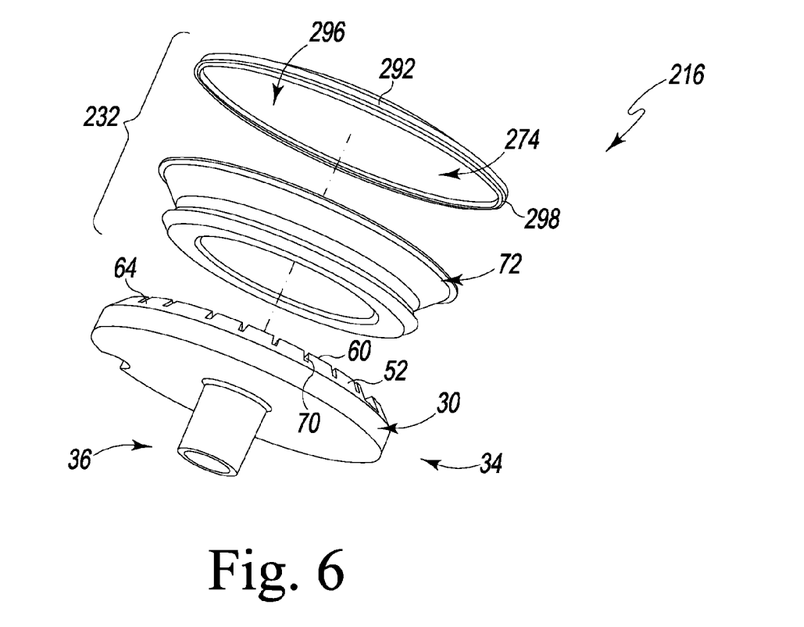
FIG. 6 is an exploded perspective view of another embodiment of a diffusion cap burner of the gas cooking appliance of FIG. 1.
Figure 7:
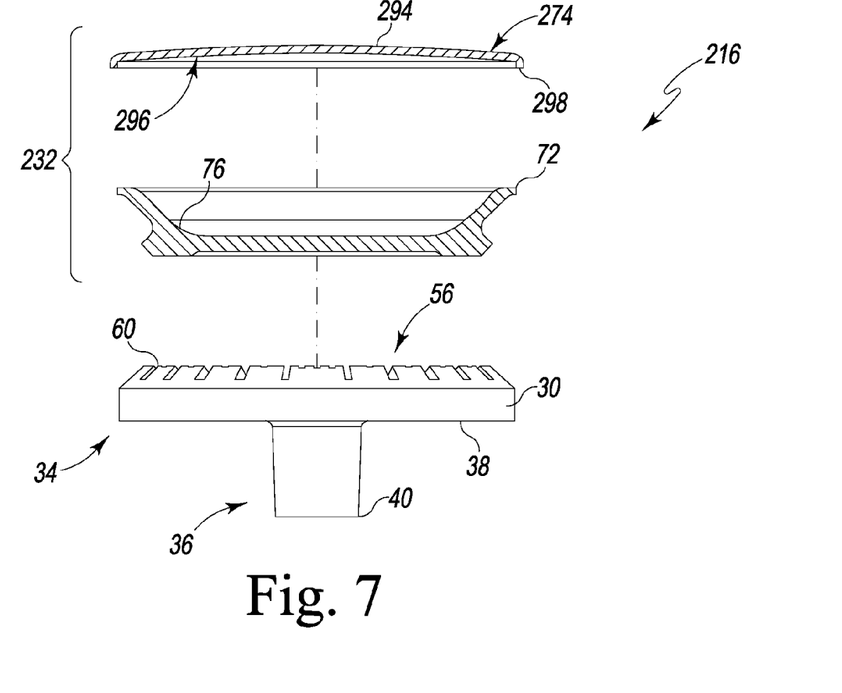
FIG. 7 is an exploded partial cross-sectional side elevation view of the diffusion cap burner of FIG. 6.

Referring now to FIGS. 6 and 7, another embodiment of the gas burner (hereinafter gas burner 216) is shown. Some features of the embodiment illustrated in FIGS. 6 and 7 are substantially similar to those discussed above in reference to the embodiment of FIGS. 2-5. Such features are designated in FIGS. 6 and 7 with the same reference numbers as those used in FIGS. 2-5.

The gas burner 216 includes a flame spreader 30 and a cap 232 configured to be coupled to the flame spreader 30. The flame spreader 30 includes a housing 34 and a gas inlet port 36 extending downwardly from a bottom surface 38 of the housing 34 to a distal end 40. The housing 34 includes a frustoconically-shaped crown 52 extending upwardly from a circular bottom wall 54 to define a chamber 56. A plurality of gas outlet ports 70 are defined in the crown 52. Each gas outlet port 70 extends downwardly from the rim 60 of the crown 52 and radially inward from the inclined annular surface 64 to the inner surface (not shown).

Figure 4:
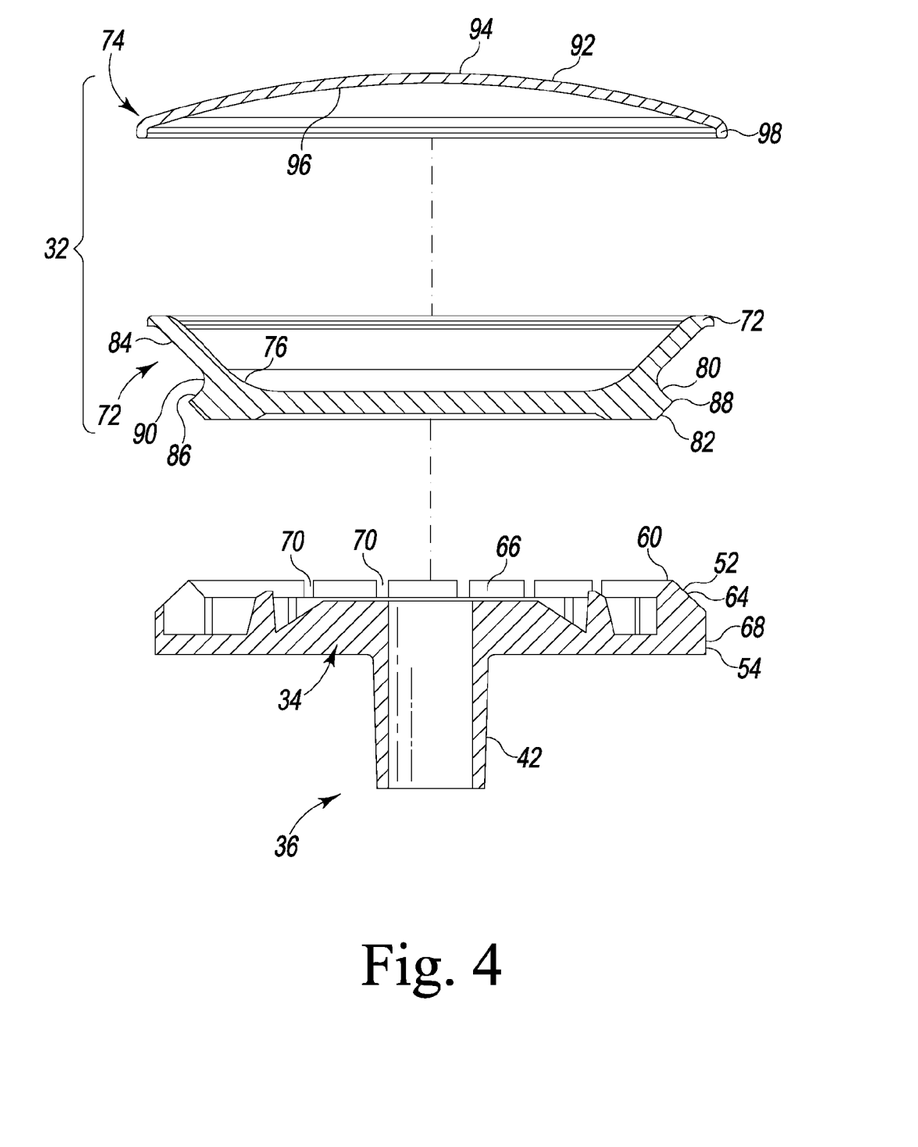
FIG. 4 is an exploded cross-sectional side elevation view of the diffusion cap burner of FIGS. 2 and 3.

The cap 232 of the burner 16 includes a shell 72 and a circular cover 274 configured to be secured to the shell 72. The cover 274 has a body 292 including an upper surface 294 of the cap 32. The body 292 is bowed or arched such that the upper surface 294 is convex. A hollow chamber 296 is defined by the body 292 and extends upwardly from a lower rim 298 of the cover 74. As shown in FIG. 4, the body 292 is bowed less than the body 92 of the embodiment of FIGS. 2-5. In that way, the chamber 296 defined by the body 292 is smaller than the chamber 96 defined by the body 92. When the cover 274 is secured to the shell 72, the lower rim 298 of the cover 74 extends over the upper rim 278 of the shell 72, thereby enclosing the chambers 76, 296 and forming a single hollow cavity within the cap 232.

Figure 8:
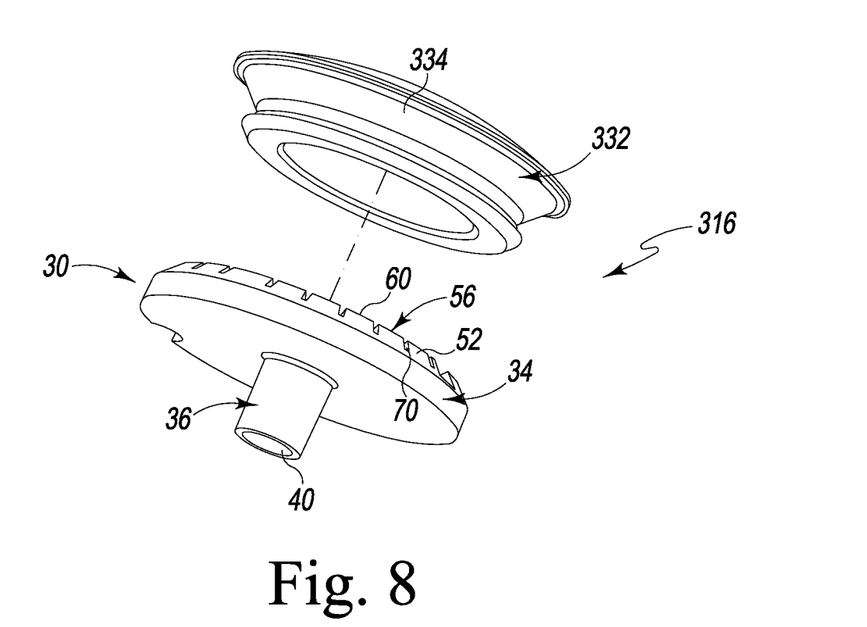
FIG. 8 is an exploded perspective view of another embodiment of a diffusion cap burner of the gas cooking appliance of FIG. 1.
Figure 9:
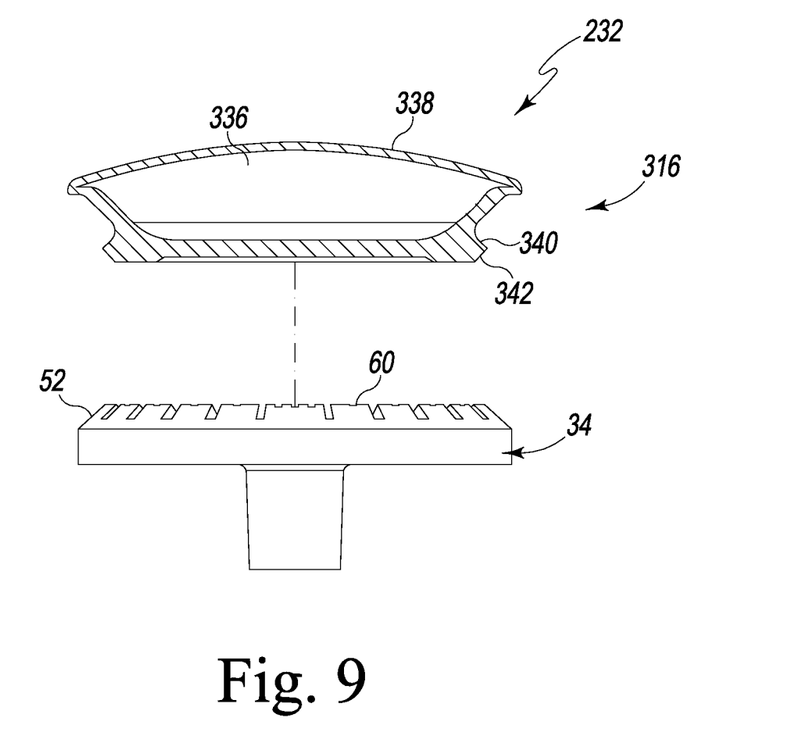
FIG. 9 is an exploded partial cross-sectional side elevation view of the diffusion cap burner of FIG. 8.

Referring now to FIGS. 8 and 9, another embodiment of the gas burner (hereinafter gas burner 316) is shown. Some features of the embodiment illustrated in FIGS. 8 and 9 are substantially similar to those discussed above in reference to the embodiment of FIGS. 2-5. Such features are designated in FIGS. 8 and 9 with the same reference numbers as those used in FIGS. 2-5.

The gas burner 316 includes a flame spreader 30 and a cap 332 configured to be coupled to the flame spreader 30. The flame spreader 30 includes a housing 34 and a gas inlet port 36 extending downwardly from a bottom surface 38 of the housing 34 to a distal end 40. The housing 34 includes a frustoconically-shaped crown 52 extending upwardly from a circular bottom wall 54 to define a chamber 56. A plurality of gas outlet ports 70 are defined in the crown 52. Each gas outlet port 70 extends downwardly from the rim 60 of the crown 52 and radially inward from the inclined annular surface 64 to the inner surface 66.

The cap 332 of the burner 16 includes a body 334 having a hollow chamber 336 defined therein. In that way, the cap 332 is formed as a single integral component. The body 334 may be formed from any heat resistant material, including metallic materials such as, for example, stamped steel or brass and non-metallic materials such as, for example, porcelain. The body 334 may be formed via casting, molding, or other suitable process.

The body 334 includes an upper surface 338 and a bottom annular flange 340 configured to engage with the crown 52. The flange 340 has a lower inclined surface 342 that matches the inner surface (not shown) of the crown 52. When the cap 32 is seated on the housing 34, the surface 342 of the body 334 is seated on the crown 52, thereby enclosing the opening 58 of the chamber 56 of the crown 52.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

The invention claimed is:

1. A gas burner for a cooktop comprising:
a frustoconically shaped crown attached to a base having a vertical annular surface and including a first inclined annular surface and a rim, the crown having an at least one gas port defined therein;
a shell having a second inclined surface, the shell secured to a cover and positioned on the crown, the shell defining a hollow chamber positioned between the crown and the cover, wherein the shell including a waist where the second inclined surface intersects with a third inclined surface, and a diameter of the waist is less than a diameter of the rim of the crown;

wherein the shell lacks gas ports; and wherein in a cross-section taken anywhere across a longitudinal extent of the shell coupled to the crown:

an angle is defined between the first inclined annular surface and the vertical annular surface; and the first inclined annular surface and the third inclined surface are aligned.

2. The gas burner of claim 1, wherein the magnitude of the angle is between 30 degrees and 45 degrees.

3. The gas burner of claim 1, wherein the shell further including a fourth inclined surface wherein in a cross-section taken anywhere across a longitudinal extent of the shell coupled to the crown:

the second inclined surface and the fourth inclined surface are orthogonal.

4. The gas burner of claim 1, wherein the diameter of the rim of the crown is less than the diameter of the cover.

5. The gas burner of claim 4, wherein the ratio of the diameter of the cover relative to the diameter of the rim of the crown is between about 1.2:1 and 1.6:1.

6. The gas burner of claim 4, wherein the cover is positioned above the crown.

7. A gas burner, comprising:

a frustoconically-shaped crown having a crown upper rim and a plurality of gas ports defined therein;

the frustoconically-shaped crown attached to a circular base, the circular base comprising: a vertical annular surface, a first inclined annular surface extending upwardly from the vertical annular surface towards the crown upper rim, and the diameter of the crown upper rim being less than the diameter of the vertical annular surface;

a shell comprising: a shell upper rim, a lower flange having a peripheral edge, a second inclined annular surface extending downwardly from the shell upper rim, a third inclined annular surface extending upwardly from the peripheral edge of the lower flange, the third inclined annular surface lacking gas ports, a fourth inclined annular surface extending downwardly from the peripheral edge, a waist positioned between the shell upper rim and the lower flange, and the diameter of the waist being less than the diameter of the shell upper rim;

a cover positioned above the shell and secured to the shell upper rim;

the shell positioned on the crown and the lower flange of the shell coupled to the crown upper rim;

wherein in a cross-section taken anywhere across a longitudinal extent of the shell coupled to the crown:

an angle is defined between the first inclined annular surface and the vertical annular surface; and the first inclined annular surface and the third inclined annular surface are aligned.

8. The gas burner of claim 7, wherein the diameter of the crown upper rim is less than the diameter of the cover.

9. The gas burner of claim 7, wherein a ratio of the diameter of the cover relative to the diameter of the crown upper rim is between about 1.2:1 and 1.6:1.

10. The gas burner of claim 7, wherein a magnitude of the angle is between 30 degrees and 45 degrees.

11. The gas burner of claim 7, wherein the shell further defining a hollow chamber positioned between the crown and the cover.

12. The gas burner of claim 7, wherein the cover is positioned between 21 mm and 25 mm above the crown.

13. A cooktop comprising:

a gas burner configured at least one of on a top surface and under a top surface of the cooktop, the gas burner comprising:

a body having a plurality of gas ports defined therein, the body having a first inclined annular surface, a vertical annular surface, and a rim;

a cap configured above the body, the gas burner having a hollow chamber defined between the cap and a top portion of the body;

a shell having a second inclined surface, the shell secured to the cap and positioned on the body, the shell defining a hollow chamber positioned between the body and the cap, wherein the shell including a waist where the second inclined surface intersects with a third inclined surface, a diameter of the waist is less than a diameter of the rim of the body, and the shell lacking gas ports; and wherein in a cross-section taken anywhere across a longitudinal extent of the shell coupled to the crown:

an angle is defined between the first inclined annular surface and the vertical annular surface;

the first inclined annular surface and the third inclined surface are aligned; and the magnitude of the angle is between 30 degrees and 45 degrees.

14. The cooktop of claim 13, wherein the ratio of the diameter of an upper surface of the cap relative to the diameter of the rim of the body is greater than or equal to about 1.2:1.

15. The cooktop of claim 13, wherein the ratio of the diameter of the upper surface of the cap relative to the diameter of the upper rim of the body is less than or equal to about 1.6:1.

* * * * *